United States Patent [19]  [11] 3,855,596
Duroux  [45] Dec. 17, 1974

[54] METHOD FOR THE LOCATION, BY SURFACE WAVES, OF A SOURCE OF ELECTROMAGNETIC RADIATION AND DETERMINATION OF THE POSITION OF A PLACE WITH RESPECT TO ONE OR MORE SOURCES

[76] Inventor: Jean Duroux, 12 Rye Flatters, Paris 5, France

[22] Filed: Nov. 2, 1971

[21] Appl. No.: 194,960

[30] Foreign Application Priority Data
Feb. 4, 1971  France .............................. 71.03769

[52] U.S. Cl. ............................................. 343/112 D
[51] Int. Cl. ............................................. G01s 3/02
[58] Field of Search ................................. 343/112 D Primary Examiner—Richard A. Farley
Assistant Examiner—T. M. Blum
Attorney, Agent, or Firm—Sughrue, Rothwell, Mion, Zinn & Macpeak

[57] ABSTRACT

A method for determining the position of a low frequency source of radiation by assuming the source approximates a harmonic magnetic dipole with a vertical axis. Measurements are taken of the angular frequency, the vertical magnetic field and the transverse electrical field and appropriate equations are utilized to derive constants and the actual distance.

3 Claims, 1 Drawing Figure

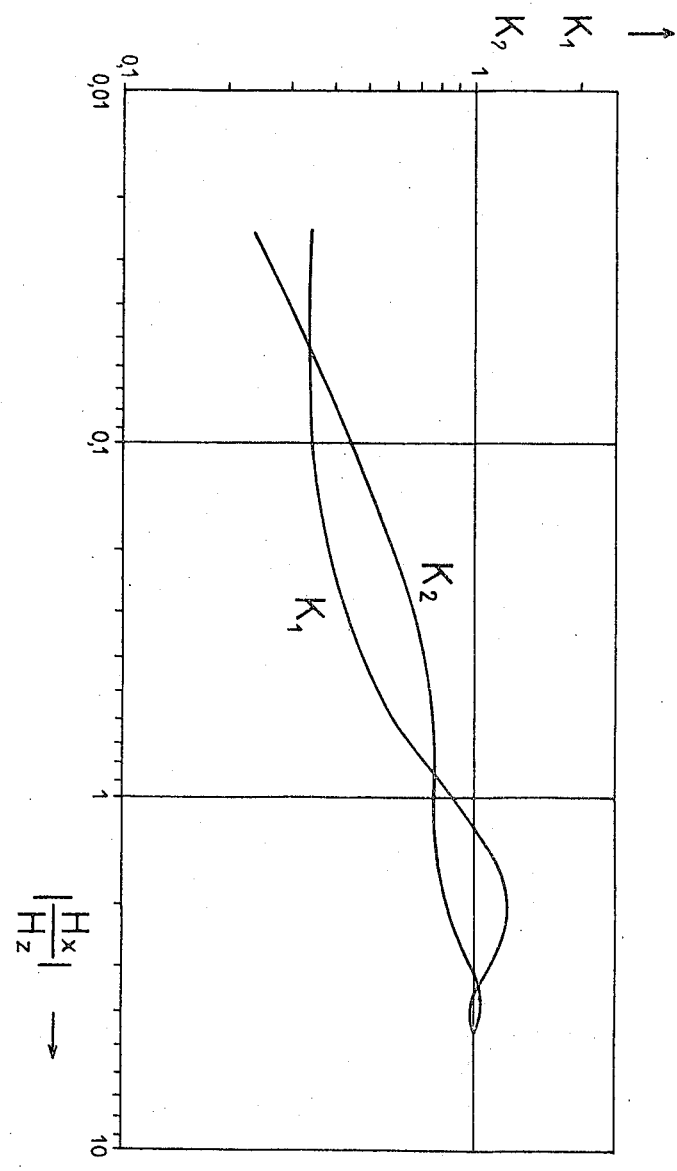

METHOD FOR THE LOCATION, BY SURFACE WAVES, OF A SOURCE OF ELECTROMAGNETIC RADIATION AND DETERMINATION OF THE POSITION OF A PLACE WITH RESPECT TO ONE OR MORE SOURCES

BACKGROUND OF THE INVENTION

1. Field of the Invention

The present invention relates to a method for locating the source of very low frequency electromagnetic radiation on the ground, on the ocean, or at a low altitude by the simple measurement, in a place removed from the source, of the components of the electromagnetic field emitted by the source.

2. Description of the Prior Art

The best known conventional method of location, based on the use of electromagnetic waves, are those of radiogoniometry, radiolocation by the network of hyperboles, and radar, those used in geodesy and those using the Doppler effect. These methods, which, in most of the applications, require expensive installations, are simply based on the determination of the direction or the time of the radiation path.

With regard to the use of surface waves, it has been considered that one might use their attenuation with distance as a measurement.

SUMMARY OF THE INVENTION

In contrast to the above, the present invention exploits the structure itself of the surface waves coming from a source.

The main objective of this invention is a method of locating, by surface waves, a very low frequency electromagnetic radiation source, on the order of zero to 10,000 cps and more, with respect to detectors of magnetic and electric fields, characterized by the fact that the source is treated like a harmonic magnetic dipole with a vertical axis. We determine in advance the values of the constant $K_1 = Hz/Ey$ (absolute) $\times$ $Ey/Hz$ (approximate), as a function of the values of $|Hx|Hz|$ measured and we calculate, on the basis of the measurements of the angular frequency $w$ of the source and of the vertical magnetic field $Hz$ and transverse electrical field $Ey$, the distance $r = 3K_1/\mu w \, |Ey/Hz|$, where $\mu$ is the magnetic permeability of the subsoil.

It follows from this that this inventive method can be used in many forms.

The invention can be used, for example, to determine a position with respect to a source, having a known position, whose emission is controlled, the source here playing the role of a beacon, identifiable by the coding of its transmission state or condition and by the frequency or frequencies of its radiation. In order to confirm the result and to increase its precision, one can also successively use, in one place, the emissions of two or more sources. At the reception place, whose position is unknown, we set up an assembly of field detectors, made up of a detector for the vertical magnetic component, two rectangular detectors for the horizontal magnetic component, and two rectangular detectors for the horizontal electrical component. Each detector is connected to a measurement or registration chain. The resultant of the magnetic horizontal component thus gives us the direction of the source and the amplitudes of the different components enable us to determine the distance of the source. One can also replace the two pairs of horizontal detectors with two orientatable detectors, capable of determining the direction of the maximum intensity of the components.

The invention can also be used to detect and locate, from a station having a known position, the position of a source having an unknown position, regardless of whether or not the condition or the frequencies of this source are or are not known. The method followed here is identical to the one above, with the exception that, in the case of the source where the rate or conditions and frequencies are unknown, we measure or register it within a wide frequency band or that, prior to the measurements, we tune the frequency of the receiver, by trial and error, to the frequency or frequencies of the source.

One can also use the invention to detect and locate a strong explosion, an atomic explosion, for example, which furnishes a source with a generally vertical symmetry access and which radiates in the spectrum of very low frequencies. The measurement device, again, is of the same type where we measure or register on one or more predetermined frequencies the nonstationary event constituted by the explosion in order, in practice, to give to it the characteristics of a harmonic wave or where we record it on a wide band with a view to a delayed processing of the information.

Another variant of the invention is a method as defined above, according to which when the subsoil is homogeneous and has a known conductivity $\sigma$, we first calculate the constant $K_2 = |Hx/Hz|$ (absolute) $\times$ $|Hz/Hx|$ (approximate). as a function of the values of $|Hx/Hz|$ as measured and according to which we calculate, on the basis of the measurement of the horizontal magnetic field Hx and the vertical magnetic field $Hz$, the distance $r = 3/K_2 \sqrt{\mu w \sigma} |Hx/Hz|$ from the source to the detectors of the magnetic fields.

According to this variant, where we assume that the conductivity of the subsoil is known, it can be seen that it suffices to use the relationship $|Hx/Hz|$ at the place of reception in order to locate the source, so that it is no longer necessary to use an electric field detector.

Other advantages and features of the invention will emerge from the following detailed description which, with reference to the attached drawing, gives the basic principle of the method claimed and its applications.

BRIEF DESCRIPTION OF THE DRAWINGS

The figure shows the curves of the values taken on by two constants $K_1$ and $K_2$ as a function of the values $|Hx/Hz|$ entering in the expression that gives the distance from the place of transmission of a source to the place of reception.

DESCRIPTION OF THE PREFERRED EMBODIMENT

The measurement process is based on the possibility of adopting, as values of the straight-line polarized components, Ey, Hx, and Hz of the electromagnetic field radiated by a harmonic magnetic dipole with a vertical axis, emitting, on ground level, a very low frequency radiation ranging from zero to 10,000 cps, for example, situated at a distance r from a reception station and under conditions which will be spelled out below, the values:

$$E_y = 6/\gamma 2 r 2) \, Eo \tag{a}$$

$$H_x = -6/\gamma r) \, Ho \tag{b}$$

$$H_z = |8/\gamma 2r2)\, H_o \qquad (c)$$

where $E_o$ and $H_o$ are the standard values of the electrical and magnetic fields produced by the dipole in the vacuum and having respectively the following value:

$E_o = -(M/4\pi r^2) j w \mu_o$ $H_o = M/4\pi r^3$

In these formulas, $M$ is the magnetic moment of the dipole, $\gamma$ is the complex propagation constant $\sqrt{j\mu_o w}$, $\overline{\rho,\mu_o}$ is the permeability of vacuum, and $w$ and $\sigma$ are, as before, the angular frequency of the source and the conductivity of the subsoil (which we assume to be homogeneous for easier explanation).

Calculation and experimentation have shown that the application of these formulas furnishes an approximation which becomes excellent when the value of $|\gamma r|$ is greater than 12. We thus find that the wave plane containing $\vec{Ey}$ and $(\vec{Hx} + \vec{Hz})$ progressively approaches the horizontal plane to be measured and that $r$ grows in order to become very close to it for the large values of $|\gamma r|$. We then, approximately and in a given place, get an evanescent horizontal plane quasiwave penetrating the subsoil, and we find that one can do without the knowledge of the conductivity of the terrain, which we assume to be constant, between the source and the place of reception. This fact is the basis for formula 2, set forth below, which gives the distance $r$ from the place of the transmission source to the place of reception as a function of the angular frequency $w$ and of $|Ey/Hz|$.

This characteristic is even more remarkable when the source and the receiving station are on the surface of the ocean.

If we now consider the more common case of a practically horizontal stratification of the conductivities of the subsoil, then experiments show that one can approximately come back to the earlier case of a homogeneous subsoil, this time considering the apparent conductivity for the frequency considered.

For a value of $\gamma r$, or of $3 |Hx/Hz|$, greater than 12, we thus find that the ratio of the modules of the components $Ey$ and $Hx$ does not depend on the electrical conductivity $\sigma$ of the subsoil, and the preceding formulas (1)$a$ – (1)$c$ above enable us to write the following:

$$r = 3/\mu_o w\, |Ey/Hz| \qquad (2)$$

Thus, the mere measurement of the ratio $|Ey/Hz|$ enables us, when the frequency used is known, to figure out the distance from the source to the place of reception. Furthermore, the location of the direction of the field $Ey$ or field $Hx$, in the course of measurements, enables us to figure out the direction of the source.

In the case where the approximation furnished by these values is not sufficient, that is to say, when the absolute value $|\gamma r|$ is too small, we find, however, that, for each value of $|\gamma r|$, it is possible to write the following, comparing the curves giving us, on the one hand, the absolute conventional value of the electrical or magnetic fields radiated at the surface of the ground as a function of $|\gamma r|$ and, on the other hand, the approximate value of these fields:

$$K_1 = |Hz/Ey|\, (\text{absolute}) \times |Ey/Hz|\, (\text{approximate}) \qquad (3)$$

The value $r$ then becomes:

$$r = 3\, K_1/\mu_o w\, |Ey/Hz| \qquad (4)$$

The constant $K_1$ can be determined for each value of $\gamma r$ as a function of $|Hx/Hz|$. More specifically, in Equation 3 which gives the constant $K_1$, the amplitudes of the electric field and of the magnetic fields are determined by computation of $\gamma r$ with the approximate values according to Equations 1$a$, 1$b$ and 1$c$ and the true values according to the conventional formulas comprising modified Bessel functions of argument $\gamma r/2$. These formulas are set out, for example, at page 567 of *Geophysical Prospecting*, Volume XV, No. 4, 1967, in an article by J. Duroux entitled "Caractères de l'Onde électromagnétique de surface engendrée par un dipole magnétique." (Characteristics of the surface electromagnetic ware generated by a magnetic dipole).

Thus, we have plotted the curve $K_1$ as a function of $Hx/Hz$ represented on the drawing.

Noting that $|\gamma r|$ is linked to $|Hx/Hz|$, as may be seen by dividing formula 1$b$ by formula 1$c$, the simple measurement of this ratio enables us to determine the value of $|\gamma r|$.

Experience shows furthermore that, in spite of the make up of the subsoil, there is practically only one single value of $K_1$ for one given value of $|Hx/Hz|$, and it therefore suffices to read off, on the curve in the single figure, the value $K_1$ for the measured value of $|Hx/Hz|$ and to apply the Expression 4 when the transmission frequency is known, in order to determine the distance from the receiver to the source as a function of the value of the modules $|Ey/Hz|$.

The direction of the source is directly known according to the direction of the component $Ey$ or the component $Hx$. It thus suffices, for this purpose, to use either one orientatable detector or two rectangular detectors.

In the case where the value of $|\gamma r|$ is very much greater than 12, it suffices directly to use the Expression 2 for the determination of the distance $r$ without having to bring in the correction factor $K_1$, as shown furthermore by curve $K_1$ which closely approximates one for values of $|Hx/Hz|$ in excess of four.

If one does not know the frequency of the transmitting source, one can utilize a series of frequency filters so that the measurements can be made for a given frequency in the manner previously disclosed.

It should be clear that the assumption of one transmitting source, made up of a magnetic dipole with a vertical axis, was given here only to facilitate the presentation and to point up the worthwhile nature of this case.

Thus, in the case of an explosion, which constitutes a nonstationary source, one can arrange, at the reception end, narrow-band filtering components, which, in practice and under known conditions, are endowed with the characteristics of a harmonic wave, and one can, for example, record the data.

Likewise, the source could be made up of a dipole with a horizontal axis, instead of being made up of a dipole with a vertical axis. However, because of the marked directional character of such a source, the measurements of the distance and the direction from the source to the place of reception become effective only for large values of $|\gamma r|$.

The source can also be situated at a low altitude and can be moved at a certain speed and then the Doppler effect can be used for the determination of the direction and speed of the source.

Furthermore, the method which has just been described, and which consists of separating the components of a wave surface on a very refractive diopter into narrow frequency bands, in addition to the previously mentioned advantages, offers the advantage of benefitting from the great reliability of the guide constituted by the surface, since we are here protected against all heterogeneities of volume, giving rise to mirage and blind-zone effects. In particular, one can benefit from guidance by the surface in order the sources on a thus, in the case of the earth's surface, to locate sources situated beyond the horizon.

It follows from this that this invention applies not only to the diopter constituted by the surface of the ground, but to any diopter presenting a high contrast of refraction indexes at the frequencies used. By way of example of diopters with high ratio index, one might mention the contact of ocean water with sediment or the contact between the sediment and the crystalline base or the contact between the upper resistant crust and the Mohorovicic discontinuity.

In the case where we know the value of conductivity $\sigma$ of the subsoil presumed to be homogeneous, one can, in order to locate the transmission of a magnetic dipole with a vertical axis, use the Expression 1 in order to derive from this, when $|\gamma r|$ is high, the value of $r$ as a function of $|Hx/Hz|$, or:

$$r = 3/\sqrt{\mu_o\, w\, \sigma} \times |Hx/Hz| \tag{5}$$

If the subsoil is well known in terms of its apparent specific resistances to the different frequencies considered, we can, for any value of $|\gamma r|$, determine the distance $r$ by introducing a correction factor $K_2$, a function like $K_1$, of $|Hx/Hz|$ and defined by $K_2 = |Hx/Hz|$ (absolute) $\times$ $|Hz/Hx|$ (approximate), where experience shows that, in spite of the constitution of the subsoil, there is practically only one single value of $K_2$ for one given value of $|Hx/Hz|$.

Under these conditions, $$r = 3/K_2 \sqrt{\mu_o\, w\, \sigma}\, |Hx/Hz| \tag{6}$$

In the case where the subsoil is not homogeneous, one can still replace $\sigma$ by $\sigma_a$, the apparent conductivity of the subsoil for the considered transmission frequency.

The single drawing gives the values of $K_2$ as a function of $|Hx/Hz|$.

This variant offers the advantage of using only two magnetic detectors. Furthermore, the measurements involve only the ratio $|Hx/Hz|$ and it is therefore not even necessary to calibrate the detectors in terms of absolute value.

The absolute values of $|Hz/Ey|$ and $|Hx/Hz|$ are determined by measuring instruments while the approximate values are derived by appropriate equations such as the standard electromagnetic equations in the specific case when the electromagnetic source is a magnetic dipole. More particularly, the appropriate equations enabling the computation of the approximate values are the Equations 1a, 1b and 1c. A detailed development of the standard electromagnetic equations for the case of a magnetic dipole as the electromagnetic source may be found with reference to the earlier cited article by J. Duroux in *Geophysical Prospecting*.

A well known magnetic dipole such as a ring having a vertical axis charged by a known alternating current can be used. The distance $r$ for the values of $Hz$ and $Ey$ for each value of Hx can be measured, for example, around the circumference of the dipole and then it is possible to compute from these parameters and with standard electromagnetic equations the values of $|Ey/Hz|$ for each value of $|Hx/Hz|$ so that a curve $K_1$ as a function of $|Hx/Hz|$ can be derived as seen in the figure. Likewise, the constant $K_2$ can be determined in a similar fashion. The absolute value determined by actual measurement will deviate from the theoretical figure.

This variant is particularly applicable on the ocean, when we have a thickness of water sufficient for the frequency considered, or on land, when one can easily determine the distribution of specific resistances, or when one can calibrate in comparision to reference sources, primarily in the case of fixed stations.

In most cases, one can replace the magnetic permeability $\mu$ of the subsoil with that of the vacuum $\mu_o$, so that the preceding relations, which introduce the permeability, can be written by introducing either $\mu$ or $\mu_o$.

What is claimed is:

1. A method of locating a source of low frequency electromagnetic radiation by measuring surface waves guided by the subsoil with magnetic and electric field detectors comprising the steps of:

detecting and measuring the values of $|Hx/Hz|$ for a source that approximates a harmonic magnetic dipole with a vertical axis;

detecting and measuring the values of angular frequency $w$ of the source, the vertical magnetic field $Hz$ and the transverse electrical field $Ey$;

determining the values of the constant $K_1 = |Hz/Ey|$ (absolute) $\times$ $|Ey/Hz|$ (approximate) as a function of the measured values of $|Hx/Hz|$ measured; and determining the distance of the source from the place of measurement from the Equation $r = 3K_1/\mu w \times |Ey/Hz|$ where $\mu$ is the magnetic permeability of the subsoil.

2. A method as in claim 1, where the final determining step is performed by assigning as the permeability of the subsoil $\mu$ the value of the permeability $\mu_o$ of a vacuum.

3. A method of locating a source of low frequency electromagnetic radiation by measuring surface waves guided by the subsoil with magnetic field detectors comprising the steps of:

detecting and measuring the values of $|Hx/Hz|$ for a source that approximates a harmonic magnetic dipole with a vertical axis;

detecting and measuring the values of angular frequency $w$ of the source, the vertical magnetic field Hz and the magnetic field Hx;

detecting and measuring the conductivity of said subsoil which may be assumed to be homogeneous;

determining the values of the constant $K_2 = |Hx/Hz|$ (absolute) $\times$ $|Hz/Hx|$ (approximate) as a function of the values of $|Hx/Hz|$ measured; and determining the distance of the source from the place of measurement from the Equation $r = 3/K_2 \sqrt{\mu w \sigma} \times |Hx/Hz|$ where $\mu$ is the magnetic permeability of the subsoil.

* * * * *